US011647398B2

(12) United States Patent
Park et al.

(10) Patent No.: US 11,647,398 B2
(45) Date of Patent: May 9, 2023

(54) DEVICE AND METHOD FOR GENERATING ENVIRONMENT INFORMATION FOR NETWORK DESIGN IN WIRELESS COMMUNICATION SYSTEM

(71) Applicant: SAMSUNG ELECTRONICS CO., LTD., Suwon-si (KR)

(72) Inventors: Wonkyun Park, Suwon-si (KR); Soonyoung Lee, Suwon-si (KR); Sungbum Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/970,148

(22) PCT Filed: Feb. 14, 2019

(86) PCT No.: PCT/KR2019/001787
§ 371 (c)(1),
(2) Date: Aug. 14, 2020

(87) PCT Pub. No.: WO2019/160340
PCT Pub. Date: Aug. 22, 2019

(65) Prior Publication Data
US 2020/0404511 A1 Dec. 24, 2020

(30) Foreign Application Priority Data
Feb. 14, 2018 (KR) .................. 10-2018-0018550

(51) Int. Cl.
*H04W 16/18* (2009.01)
*H04B 17/27* (2015.01)
(Continued)

(52) U.S. Cl.
CPC ............ *H04W 16/18* (2013.01); *H04B 17/27* (2015.01); *H04B 17/3912* (2015.01); *H04W 16/22* (2013.01)

(58) Field of Classification Search
CPC ...... H04W 16/18; H04W 16/22; H04B 17/27; H04B 17/3912
(Continued)

(56) References Cited

U.S. PATENT DOCUMENTS 10,012,735 B1 * 7/2018 Loveland .............. B64C 39/024
2006/0227041 A1 10/2006 Okamoto
(Continued)

FOREIGN PATENT DOCUMENTS

CN 101782370 7/2010
CN 107533801 1/2018
(Continued)

OTHER PUBLICATIONS

Extended Search Report dated Feb. 17, 2021 in counterpart European Patent Application No. EP19753950.5.
(Continued)

*Primary Examiner* — Chuck Huynh
(74) *Attorney, Agent, or Firm* — Nixon & Vanderhye P.C.

(57) ABSTRACT

The present disclosure relates to a 5th generation (5G) or pre-5G communication system for supporting a data transmission rate higher than that of a 4th generation (4G) communication system such as long term evolution (LTE). The present disclosure is to generate environment information for a network design, and a method for generating environment information may include determining a location difference value of a building between first information based on photographing and second information based on
(Continued)

measurement, and correcting a location of an obstacle determined using the first information using the location difference value.

11 Claims, 17 Drawing Sheets

(51) Int. Cl.
    *H04B 17/391*     (2015.01)
    *H04W 16/22*     (2009.01)

(58) Field of Classification Search
    USPC .......................................................... 455/446
    See application file for complete search history.

(56) References Cited

U.S. PATENT DOCUMENTS

| | | |
|---|---|---|
| 2010/0045439 A1 | 2/2010 | Tak et al. |
| 2011/0287801 A1* | 11/2011 | Levin .................. H04B 17/391 |
| | | 455/517 |
| 2013/0172010 A1 | 7/2013 | Kang et al. |
| 2013/0267260 A1 | 10/2013 | Chao et al. |
| 2015/0296388 A1 | 10/2015 | Bassiri et al. |
| 2016/0307366 A1 | 10/2016 | Priest et al. |

FOREIGN PATENT DOCUMENTS

| | | |
|---|---|---|
| KR | 10-0706913 | 4/2007 |
| KR | 10-2010-0023552 | 3/2010 |
| KR | 10-2012-0000350 | 1/2012 |
| KR | 10-1616486 | 4/2016 |

OTHER PUBLICATIONS

International Search Report for PCT/KR2019/001787, dated May 24, 2019, 4 pages.
Written Opinion of the ISA for PCT/KR2019/001787, dated May 24, 2019, 6 pages.
Communication pursuant to Article 94(3) EPC dated Sep. 3, 2021 in counterpart European Patent Application No. EP19753950.5.
Notice of Preliminary Rejection dated Oct. 21, 2021 in counterpart Korean Patent Application No. 10-2018-0018550 and English-language translation.
Office Action dated Mar. 2, 2022 in Chinese Patent Application No. 201980013512.2 and English-language translation.
Notice of Patent Grant dated Apr. 11, 2022 in Korean Patent Application No. 10-2018-0018550 and English-language translation.

* cited by examiner

DEVICE AND METHOD FOR GENERATING ENVIRONMENT INFORMATION FOR NETWORK DESIGN IN WIRELESS COMMUNICATION SYSTEM

This application is the U.S. national phase of International Application No. PCT/KR2019/001787 filed 14 Feb. 2019, which designated the U.S. and claims priority to KR Patent Application No. 10-2018-0018550 filed 14 Feb. 2018, the entire contents of each of which are hereby incorporated by reference.

FIELD

The present disclosure generally relates to a wireless communication system, and more particularly, to an apparatus and a method for generating environment information for network design in a wireless communication system.

DESCRIPTION OF RELATED ART

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of radio waves and to extend a propagation distance of radio waves in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superlocation coding (SWSC) as advanced coding modulation (ACM) schemes, and filter bank multi carrier (FBMC), non orthogonal multiple access (NOMA), and sparse code multiple access (SCMA) as advanced access technologies.

The 5G system is expected to use some higher frequency band than the conventional cellular system (e.g., LTE). Due to the use of the higher frequency band, cell coverage of the 5G system gets smaller, and signal attenuation gets greater, than the conventional cellular system. Thus, if accurate prediction for service availability according to a user's location is preceded, better service may be provided.

SUMMARY

Based on the discussions described above, the present disclosure provides an apparatus and a method for generating more accurate environment information for network design in a wireless communication system.

Also, the present disclosure provides an apparatus and a method for generating environment information which more accurately indicates a location of an obstacle in a wireless communication system.

Also, the present disclosure provides an apparatus and a method for correcting a location value extracted from information of an image type using measured information in a wireless communication system.

According to various embodiments of the present disclosure, a method for generating environment information in a wireless communication system, may include determining a location difference value of a building between first information based on photographing and second information based on measurement, and correcting a location of an obstacle determined using the first information using the location difference value.

According to various embodiments of the present disclosure, an apparatus for generating environment information in a wireless communication system may include, a transceiver for transmitting and receiving a signal, and at least one processor connected with the transceiver, wherein the at least one processor may determine a location difference value of a building between first information based on photographing and second information based on measurement, and correct a location of an obstacle determined using the first information using the location difference value.

An apparatus and a method according to various embodiments of the present disclosure, may provide more accurate environment information, by correcting a location value extracted from information of an image type using measured information.

Effects obtainable from the present disclosure are not limited to the above-mentioned effects, and other effects which are not mentioned may be clearly understood by those skilled in the art of the present disclosure through the following descriptions.

DETAILED DESCRIPTION OF EXAMPLE EMBODIMENTS

Terms used in the present disclosure are used for describing particular embodiments, and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for generating environment information for network design in a wireless communication system. Specifically, the present disclosure explains a technique for providing more accurate environment information, by correcting a location value extracted from information of an image type using measured information in the wireless communication system.

Terms indicating environmental information (e.g., image information, measurement information), terms indicating environmental elements (e.g. a buildings, an obstacle), terms indicating service related states (e.g., availability), terms indicating control information, terms indicating network entities (e.g., a server), and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standard (e.g., 3rd generation partnership project (3GPP)), which are merely exemplary for explanations. Various embodiments of the present disclosure may be easily modified and applied in other communication systems.

Figure 1:
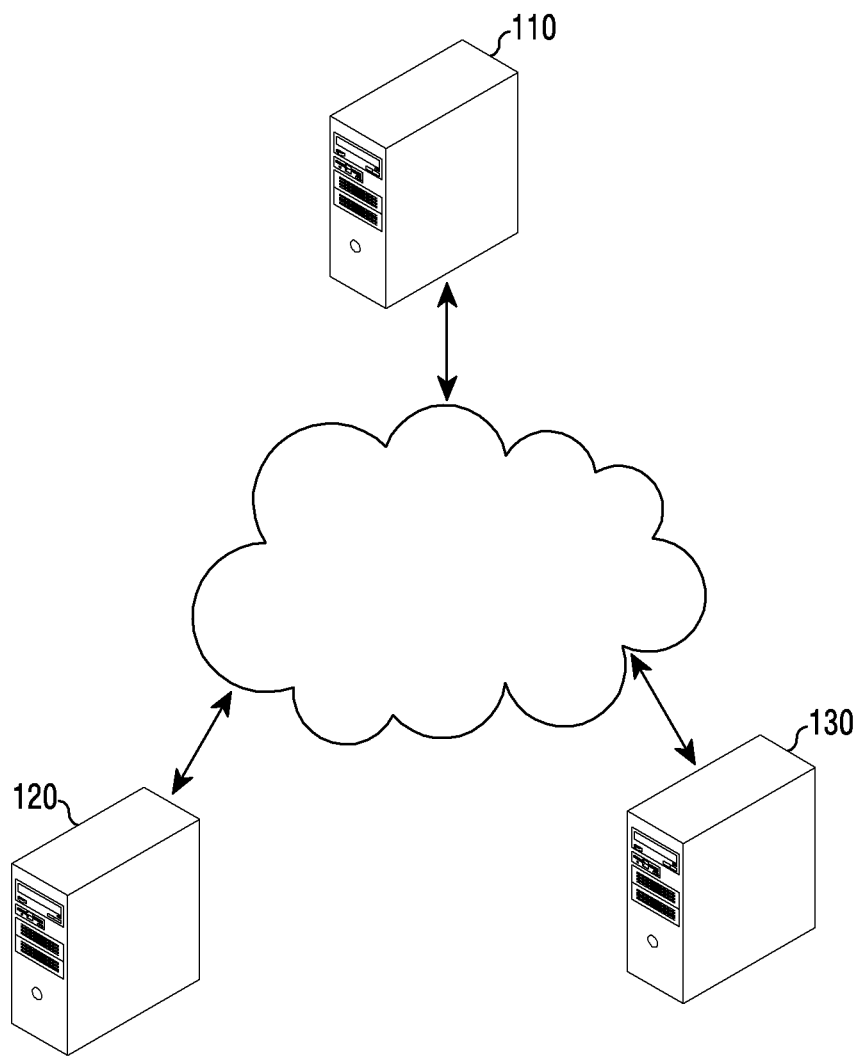
FIG. 1 illustrates a system according to various embodiments of the present disclosure.

FIG. 1 illustrates a system according to various embodiments of the present disclosure. FIG. 1 illustrates a first server 110, a second server 120, and a third server 130, as entities related to generating environment information. The first server 110, the second server 120, and the third server 130 each may be configured by installing a program for performing a corresponding function in a general-purpose server, or may be a device exclusively designed to perform the corresponding function.

The first server 110 generates environment information. The first server 110 may be operated by a service provider or a system operator. To generate the environment information, the first server 110 may obtain necessary information from the second server 120 or the third server 130. For example, the necessary information is information about a region for generating the environment information, and may include information relating to a terrain, a building, a road, a facility, a tree, and the like.

The second server 120 stores observation information generated through photographing, and provides it to the first server 110. The observation information stored in the second server 120 may be generated through a camera at a high altitude using a drone or an aircraft. For example, the observation information may have a form of an image or a video. For the sake of descriptions, the information provided from the second server 120 may be referred to as 'image information', 'satellite view', 'first information', and the like.

The third server 130 stores information generated through measurement, and provides it to the first server 110. For example, the measurement may be performed based on images measured at different angles with respect to the same object, based on reflected waves of light (e.g., light detection and ranging (LiDAR)), or based on electromagnetic signals. Accordingly, the information stored in the third server 130 has relatively higher accuracy than the information stored in the second server. However, compared to the information stored in the second server 120, there are fewer types of the target of the information stored in the third server 130. For example, the third server 130 may include only information relating to all but some targets (e.g., obstacles such as trees and facilities), for example, a building. For the sake of descriptions, the information provided from the third server 130 may be referred to as 'measurement information', 'building map', 'second information', and so on. In various embodiments, the measurement information is illustrated as including building information but not including obstacle information.

In addition, although not depicted in FIG. 1, the system may further include a fourth server for network design and availability determination. The fourth server may receive the environment information from the first server 110, determine service availability at a specific location using the environment information, and perform the network design (e.g., determine a base station installation location, etc.).

It may be important to obtain exact locations of buildings and obstacles to increase the accuracy of the network design. That is, reliability of the network design may fall if not obtaining the exact location of the obstacle. Herein, the building is a place where a subscriber device (e.g., a consumer premises equipment (CPE), a user equipment (UE), a terminal, etc.) may be located, and the obstacle indicates an object which prevents radio signal transmission between the subscriber device and the base station.

Figure 2:
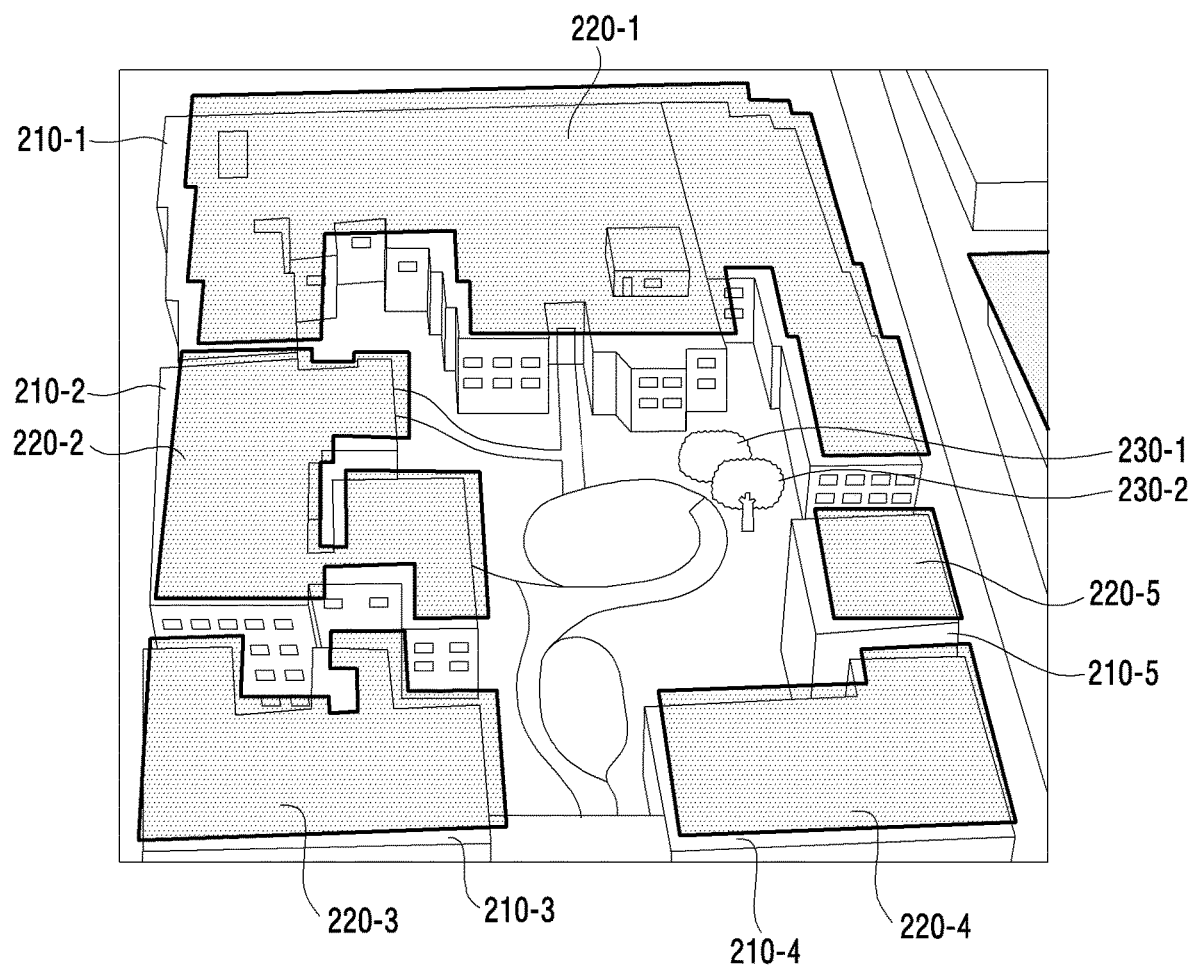
FIG. 2 illustrates an example of image information and measurement information in a wireless communication system according to various embodiments of the present disclosure.

FIG. 2 illustrates an example of image information and measurement information in a wireless communication system according to various embodiments of the present disclosure. FIG. 2 illustrates measurement information overlapped on image information. Referring to FIG. 2, locations and sizes of buildings 210-1 through 210-5 identified by the image information (e.g., information stored in the second server 120) are not identical to locations 220-1 through 220-5 determined by the measurement information (e.g., information stored in the third server 120). That is, since the image information is based on the photographing, the image information may have some error. Accordingly, there may be misalignment between a location of a specific building determined by the image information and a location of a specific building determined by the measurement information. Furthermore, since the error varies for each building, the error for a location of an obstacle 230-1 or 230-2 may be greater. Accordingly, based on the measurement information, the location of the obstacle 230-1 or 230-2 (e.g., a tree) determined through the image information may be inaccurate.

The measurement information determined in a more precise manner than the image information has relatively high accuracy. Hence, more effective network design may be possible, if the location of the obstacle determined through the image information is accurately corrected based on an important point (e.g., a building center, a window, a wall, etc.) in radio wave reception characteristics. Accordingly, the present disclosure describes various embodiments for correcting the location of the obstacle determined using the image information using the measurement information.

Figure 3:
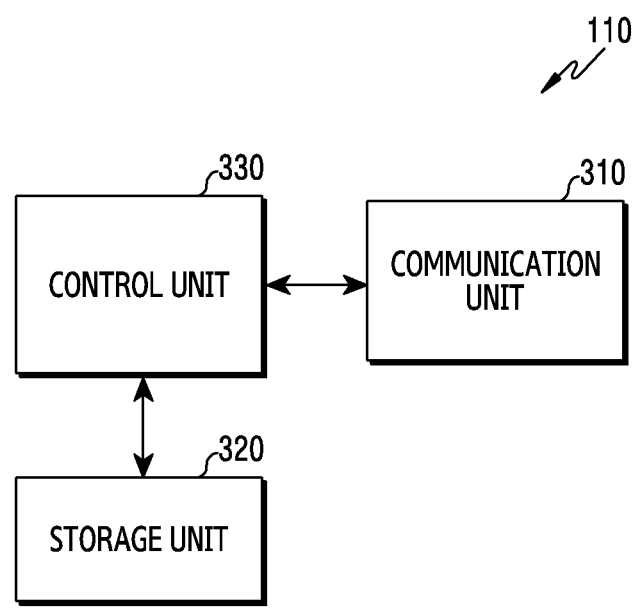
FIG. 3 illustrates a configuration of a server for generating environment information in a wireless communication system according to various embodiments of the present disclosure.

FIG. 3 illustrates a configuration of a server in a wireless communication system according to various embodiments of the present disclosure. The configuration illustrated in FIG. 3 may be understood as the configuration of the first server 110. A term such as 'portion' or '~ er' used hereafter indicates a unit for processing at least one function or operation, and may be implemented using hardware, software, or a combination of hardware and software.

Referring to FIG. 3, the server includes a communication unit 310, a storage unit 320, and a control unit 330.

The communication unit 310 provides an interface for communicating with other entities (e.g., the server 120 or 130) in the network. That is, the communication unit 310 converts a bit string transmitted from the server to other entity, to a physical signal, and converts a physical signal received from other entity, to a bit string. That is, the communication unit 310 may transmit and receive signals. Hence, the communication unit 310 may be referred to as a modem, a transmitter, a receiver or a transceiver.

The storage unit 320 stores a basic program for operating the server, an application program, and data such as setting information. Particularly, the storage unit 320 may store information relating to a terrain, a building, an obstacle, and so on obtained from another server (e.g., the server 120 or 130). For example, the information obtained from the another server may include image information, and the measurement information. The storage unit 320 provides the stored data according to a request of the control unit 330.

The control unit 330 controls general operations of the server. For example, the control unit 330 transmits and receives signals through the communication unit 310. Also, the control unit 330 records and reads data in and from the storage unit 320. For doing so, the control unit 330 may include at least one processor. According to various embodiments, the control unit 330 generates environment information based on the image information and the measurement information. In so doing, the control unit 330 may correct the location of the obstacle. For example, the control unit 330 may control the server to carry out operations according to various embodiments to be explained.

Figure 4:
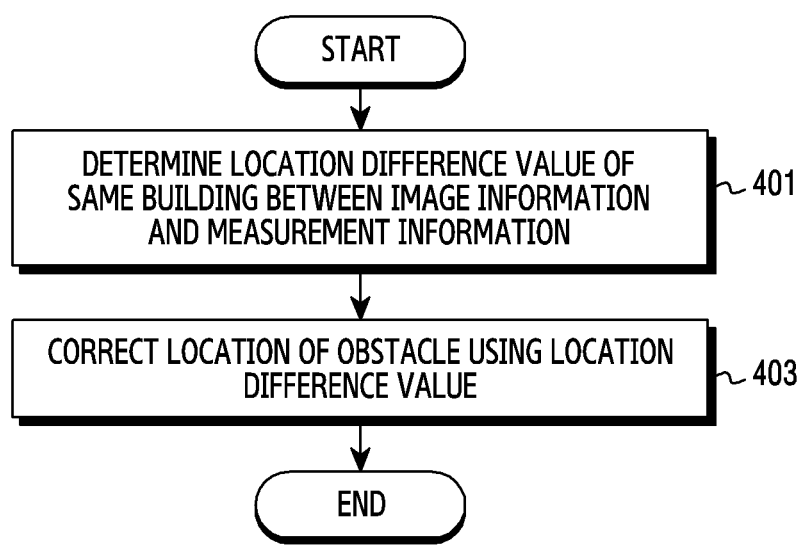
FIG. 4 illustrates a flowchart of a server for generating environment information in a wireless communication system according to various embodiments of the present disclosure.

FIG. 4 is a flowchart illustrating a server for generating environment information in a wireless communication system according to various embodiments of the present disclosure. FIG. 4 illustrates an operating method of the first server 110.

Referring to FIG. 4, in step 401, the server determines a location difference value of a building between image information and measurement information. That is, even for the same building, the location determined based on the image information and the location determined based on the measurement information may be different. At this time, to determine the location difference value, an operation of determining a reference point of the building may be preceded.

In step 403, the server corrects a location of an obstacle determined using the image information by using the location difference value. For example, the server may correct the location of the obstacle to match the measurement information. That is, the server may correct the location of the obstacle, by moving the location of the obstacle by the location difference value.

Figure 5:
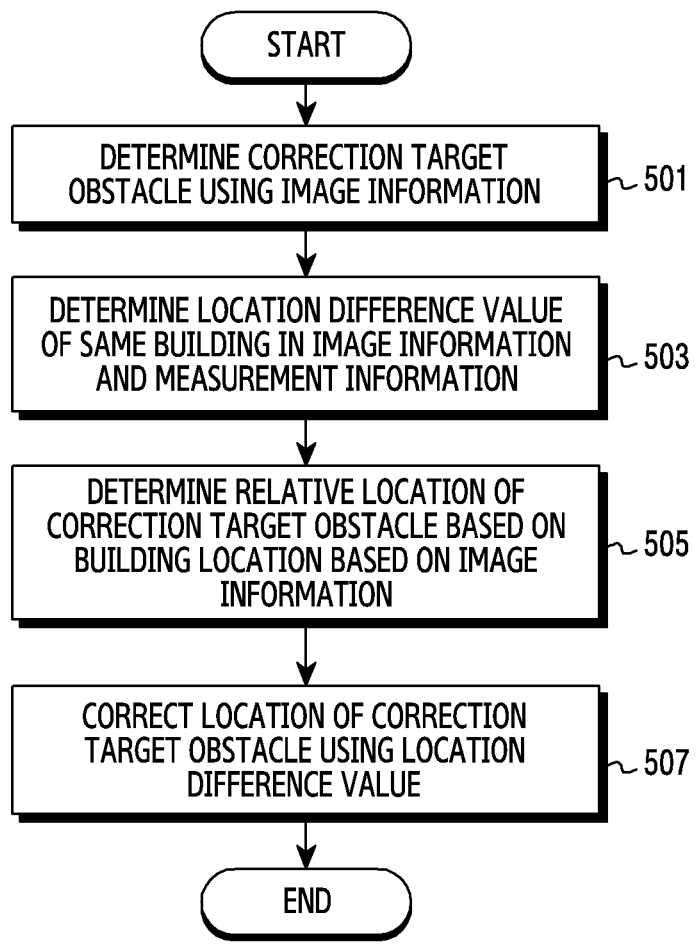
FIG. 5 illustrates a more detailed flowchart of a server for generating environment information in a wireless communication system according to various embodiments of the present disclosure.

FIG. 5 illustrates a more detailed flowchart of a server for generating environment information in a wireless communication system according to various embodiments of the present disclosure. FIG. 5 illustrates an operating method of the first server 110.

Figure 6A:
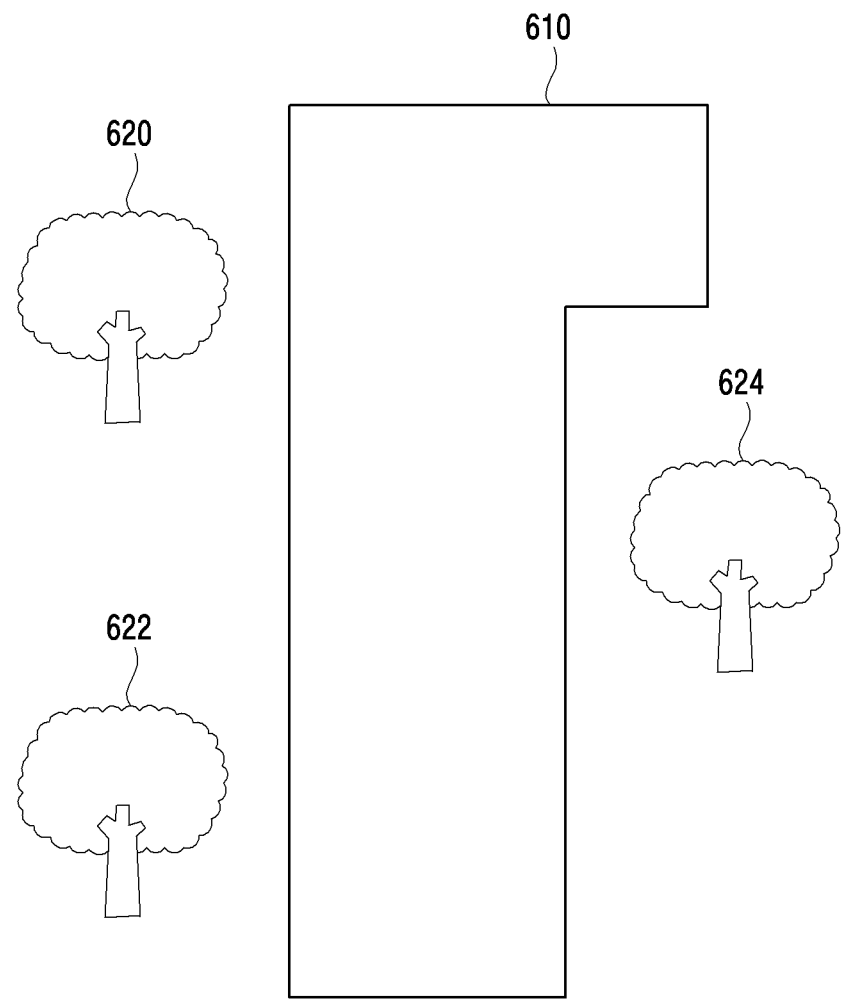
FIG. 6A illustrates an example of obstacle determination in a procedure for compensating for a location of an obstacle in a wireless communication system according to various embodiments of the present disclosure.

Referring to FIG. 5, in step 501, the server determines an obstacle to be corrected (hereinafter, referred to as a 'correction target obstacle') using image information. For example, the server may determine the correction target obstacle based on a building where a radio receiver (e.g., a CPE, a UE, etc.) may be located. Referring to FIG. 6A, using the image information, the server may identify obstacles 520, 522, and 524 based on a building location 510 as the correction target obstacle. The building location 510 of FIG. 6A is a location and an area of the building determined using the image information, and represents an outline of the building. Herein, the correction target obstacle is an object which affects radio wave reception characteristics, and is an object of which location based on the image information is corrected based on the measurement information to raise accuracy of the network design simulation.

Figure 6B:
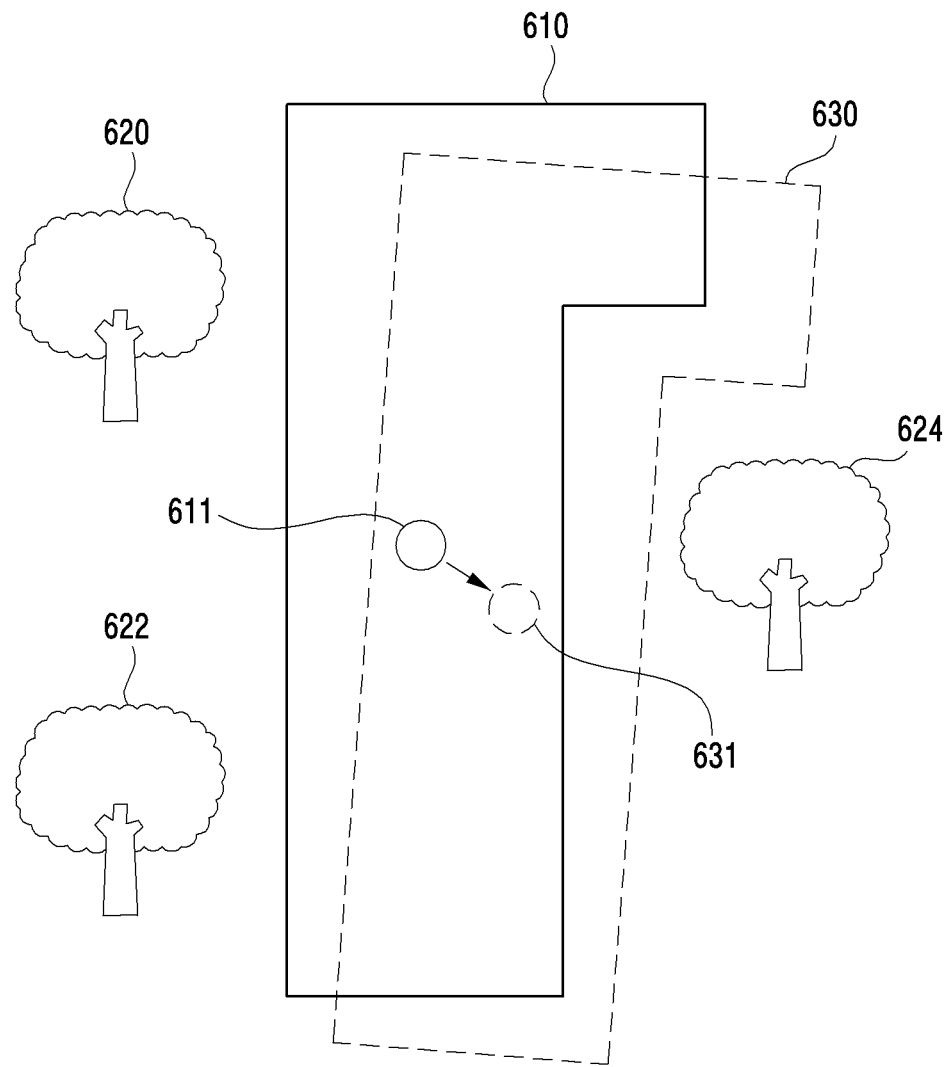
FIG. 6B illustrates an example of determining a location difference value in the procedure for compensating for the location of the obstacle in the wireless communication system according to various embodiments of the present disclosure.

In step 503, the server determines a location difference value of the same building in the image information and the measurement information. According to an embodiment, the server determines a reference point for determining the location difference value of the building, compares reference points of the same building determined using the image information and the measurement information respectively, and thus determines the location difference value of the same building between the image information and the measurement information. For example, referring to FIG. 6B, the server determines a reference point 611 of the building based on the image information, and determines a reference point 631 of the building based on the same measurement information as the building location 610 based on the image information. In so doing, the reference point 611 based on the image information and the reference point 631 based on the measurement information are determined at the same relative location of the same building, to determine the location difference value of the same building in the image information and the measurement information. The server determines the location difference value of the same building in the image information and the measurement information, by comparing the locations of the reference point 611 based on the image information and the reference point 631 based on the measurement information.

Figure 6C:
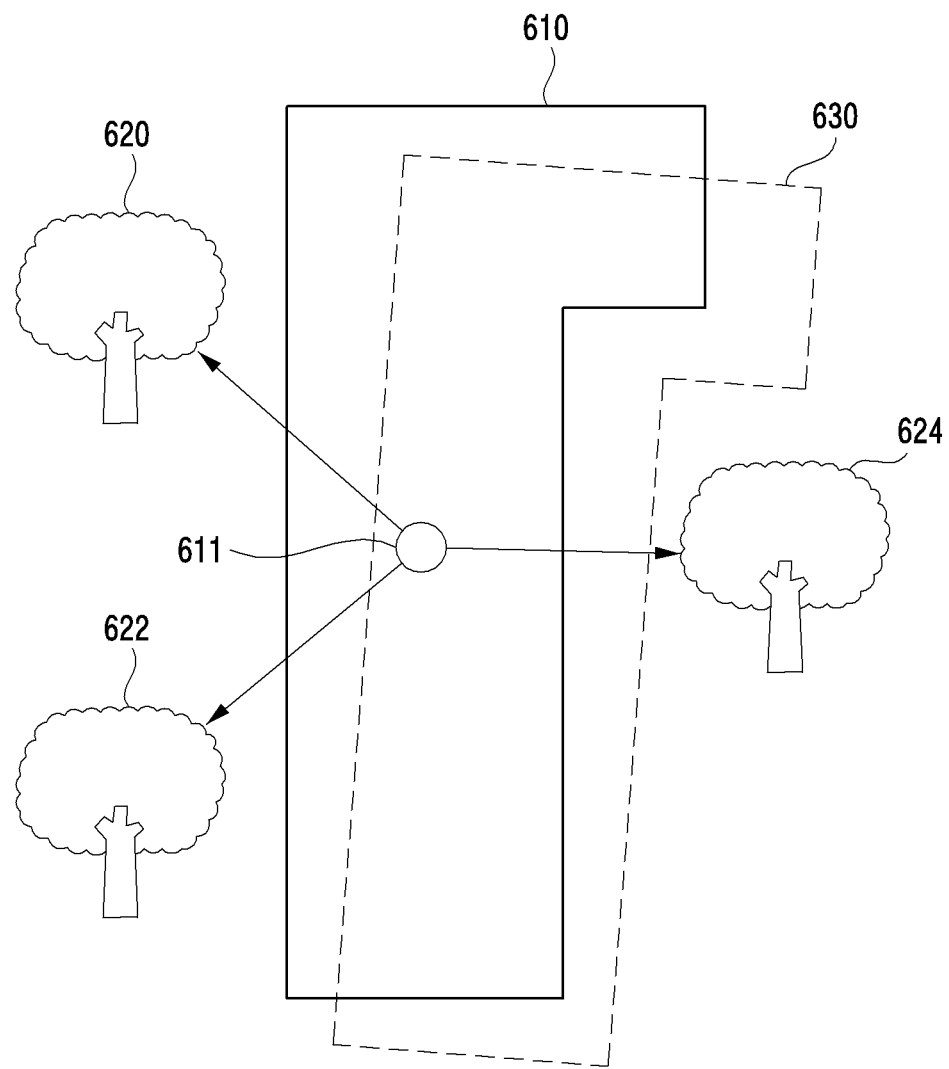
FIG. 6C illustrates an example of determining a relative location of the obstacle in the procedure for compensating for the location of the obstacle in the wireless communication system according to various embodiments of the present disclosure.

In operation 505, the server determines a relative location of a correction target obstacle based on the location of the building based on the image information. According to an embodiment, the server may determine relative locations of the correction target obstacles identified in step 501 based on the location of the building based on the image information. For example, referring to FIG. 6C, the server determines relative locations of correction target obstacles 620, 622, and 624 identified in step 601 based on the reference point 611 which is the center of the building location 610 based on the image information. In an embodiment, the relative locations of the correction target obstacles 620, 622, and 624 may be relatively represented with an angle and a distance based on the reference point 611 of the building based on the image information.

Figure 6D:
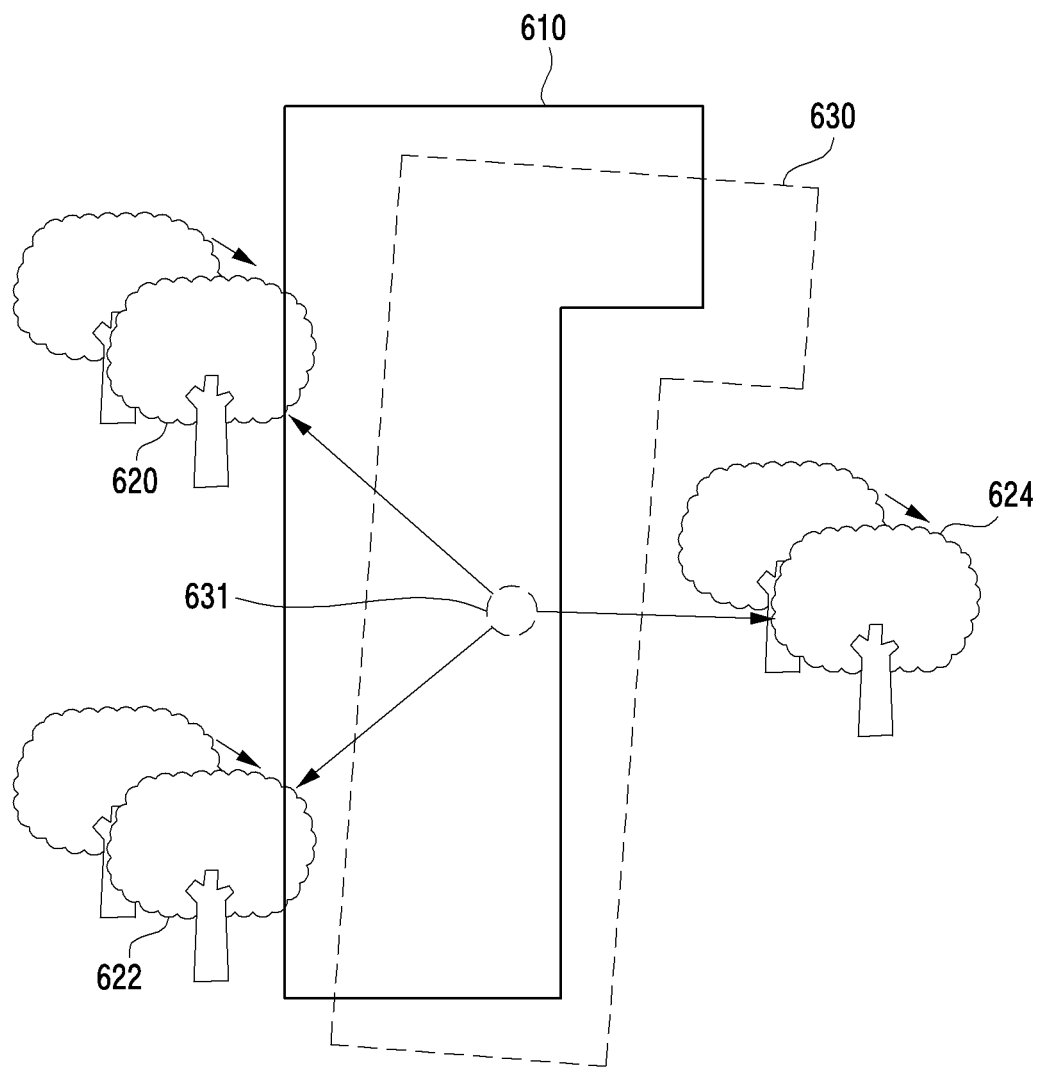
FIG. 6D illustrates an example of correcting the location of the obstacle in the procedure for compensating for the location of the obstacle in the wireless communication system according to various embodiments of the present disclosure.

In operation 507, the server corrects the location of the correction target obstacle using the location difference value. According to an embodiment, the server corrects the location of the correction target obstacle by moving the location of the correction target obstacle by the location difference value of the same building in the image information and the measurement information. Correcting the location of the correction target obstacle based on the image information is to increase the accuracy of the network design simulation. For example, referring to FIG. 6D, the server corrects the locations of the correction target obstacles 620, 622, and 624 by a location difference value corresponding to a difference value between the reference point 611 based on the image information and the reference point 631 based on the measurement information. In an embodiment, the locations of the correction target obstacles 620, 622, and 624 may be relatively represented with an angle and a distance based on the reference point 631 of the building based on the measurement information.

In the embodiment described with reference to FIG. 5 and FIG. 6A through FIG. 6D, the reference point 511 and the reference point 531 are illustrated close to the center of the corresponding building location. However, according to various embodiments, the reference point may be determined differently. Herein, for example, the reference point may be determined in consideration of the radio wave reception characteristics. Specifically, the reference point of the building may be determined to a window of the building, an entrance, a user's room, and so on in consideration of an appearance frequency of a user equipment. In addition, the reference point of the building may be determined to a surface of the wall of the building closest to a location of a base station in consideration of the location of the base station. That is, the reference point of the building may be determined in consideration of the radio wave reception characteristics including the appearance frequency of the user equipment and the location of the base station. In addition, in FIG. 6A through FIG. 6D, the reference point is illustrated as the single point, but may be determined to a line, a surface, or the like, rather than the point, according to another embodiment.

In the embodiment described with reference to FIG. 5 and FIG. 6A through FIG. 6D, the correction target obstacles are determined. Herein, the correction target obstacles may be determined in various manners. Embodiments for determining the correction target obstacle are described below with reference to FIG. 7 and FIG. 8.

Figure 7:
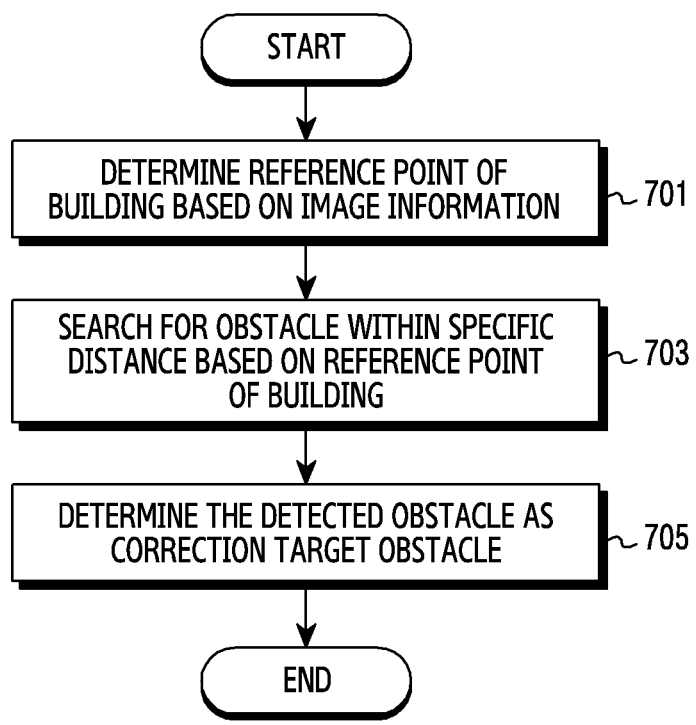
FIG. 7 illustrates a flowchart of a server for determining a correction target obstacle in a wireless communication system according to various embodiments of the present disclosure.

FIG. 7 illustrates a flowchart of a server for determining a correction target obstacle in a wireless communication system according to various embodiments of the present disclosure. FIG. 7 illustrates an operating method of the first server 110.

Referring to FIG. 7, in step 701, the server determines a reference point of a building based on image information. For example, the reference point of the building may be determined to a window of the building, an entrance, a user's room, and so on, in consideration of statistical information (e.g., appearance frequency, presence probability, etc.) of users. As another example, the reference point of the building may be determined to a surface of the wall of the building closest to the location of the base station in consideration of the location of the base station. That is, the reference point of the building may be determined by considering the statistical information of the users and the radio wave reception characteristics including the location of the base station.

In operation 703, the server searches for an obstacle within a specific distance based on the reference point of the building. An obstacle located within the specific distance from the reference point of the building including a radio receiver may considerably interfere with the radio reception. That is, an obstacle adjacent to the building may cause signal blocking and interference to the radio receiver located in the building. By contrast, an obstacle located outside the specific distance from the building where the radio receiver is located may exert relatively less effect on the radio reception. Thus, the server searches for at least one obstacle within the specific distance based on the reference point of the building. Herein, the specific distance may be set differently according to various factors (e.g., a frequency band, network operator's requirements, service characteristics of a corresponding region).

In operation 705, the server determines the detected obstacle as the correction target obstacle. Specifically, the server determines obstacles within the specific distance based on the reference point of the building based on the image information retrieved in step 703 as the correction target obstacles.

Figure 8:
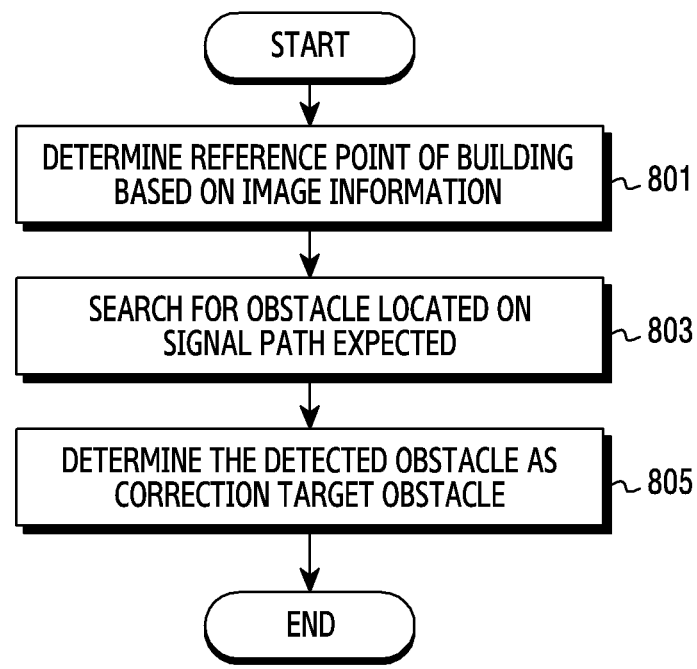
FIG. 8 illustrates another flowchart of a server for determining a correction target obstacle in a wireless communication system according to various embodiments of the present disclosure.

FIG. 8 illustrates another flowchart of a server for determining a correction target obstacle in a wireless communication system according to various embodiments of the present disclosure. FIG. 8 illustrates an operating method of the first server 110.

Referring to FIG. 8, in step 801, the server determines a reference point of a building based on image information. For example, the reference point of the building may be determined to a window of the building, an entrance, a user's room, and so on in consideration of statistical information (e.g., appearance frequency, presence probability, etc.) of users. As another example, the reference point of the building may be determined to a surface of the wall of the building closest to the location of the base station in consideration of the location of the base station. That is, the reference point of the building may be determined by considering the statistical information of the users and the radio wave reception characteristics including the location of the base station.

In step 803, the server searches for an obstacle located on an expected signal path. Herein, the expected signal path indicates a signal path where the corresponding signal is expected to travel, if the signal transmitted from the base station is transmitted to the radio receiver. The server may determine the expected signal path by considering the location of the base station transmitting the signal, the location of the radio wave receiver in the building, a line of sight (LoS) path between the base station and the radio wave receiver, and a reflected wave path.

In operation 805, the server determines the detected obstacle as the correction target obstacle. Specifically, the server determines obstacles within a specific distance as correction target obstacles based on the reference point of the building based on the image information retrieved.

Operations for identifying the correction target obstacle of the obstacle location correction server in FIG. 7 and FIG. 8 may be performed independently or simultaneously. If operations of FIG. 7 and FIG. 8 are performed at the same time, the server may search for an obstacle within a preset distance based on the reference point of the building based on the image information and concurrently search for an obstacle located on the expected signal path, and thus identify the obstacles within the specific distance from the reference point of the building and located on the expected signal path as the correction target obstacles.

Figure 9:
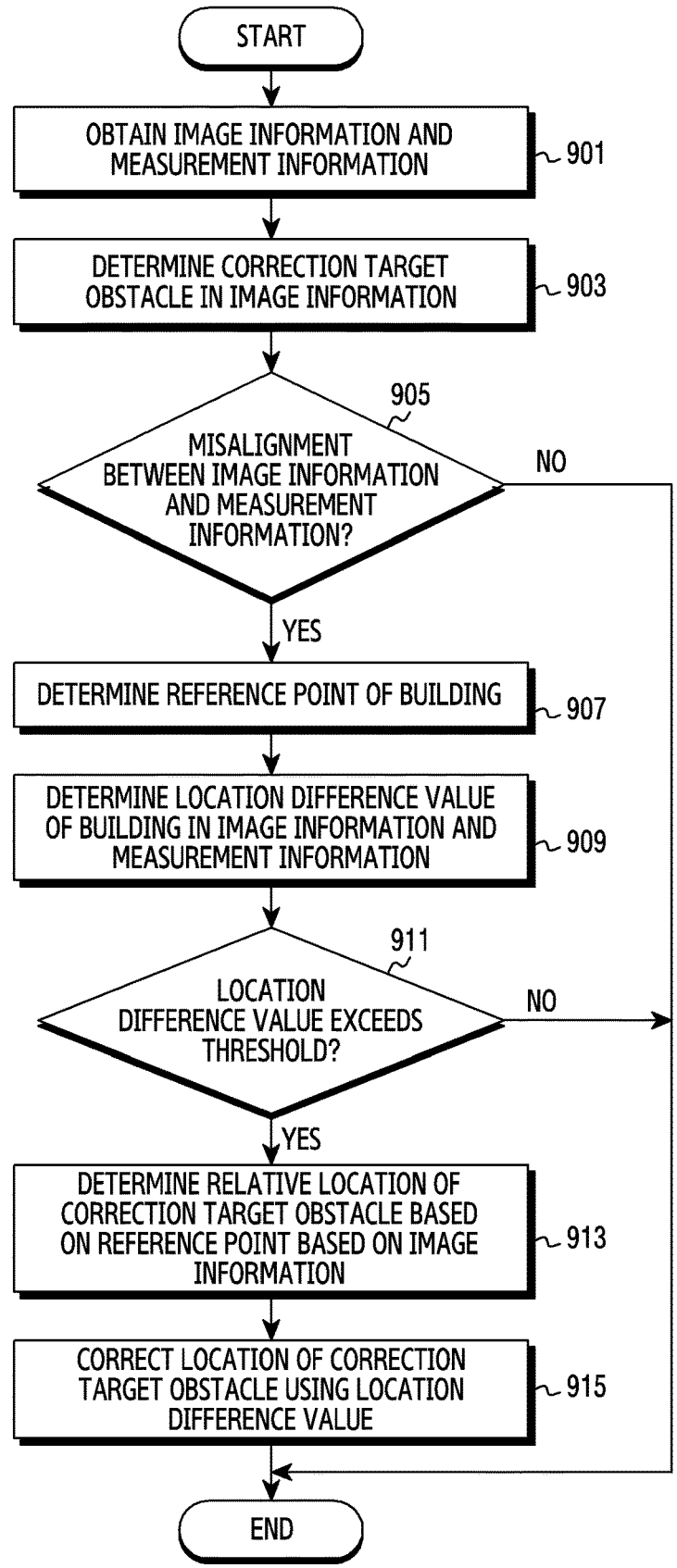
FIG. 9 illustrates a more detailed flowchart of a server for generating environment information in a wireless communication system according to various embodiments of the present disclosure.

FIG. 9 illustrates a more detailed flowchart of a server for generating environment information in a wireless communication system according to various embodiments of the present disclosure. FIG. 9 illustrates an operating method of the server.

Referring to FIG. 9, in step 901, the server obtains image information and measurement information. For example, the server may receive the measurement information and the image information from at least one other server (e.g., the second server 120, the third server 130).

In step 903, the server determines a correction target obstacle in the image information. Specifically, the server identifies the correction target obstacle based on the building where the radio receiver is located. For example, the server may determine the correction target obstacle by considering a distance to the building or presence or absence on a signal path.

In step 905, the server determines whether there is misalignment between the image information and the measurement information. Specifically, the server determines whether the building including the radio wave receiver is misaligned in the image information and the measurement information. For example, the criterion for determining the misalignment may be defined based on an area of a non-overlapping portion of the locations of the same building between the image information and the measurement information, a ratio of the overlapping portion and the nonoverlapping portion, and so on. According to an embodiment, the misalignment determining criterion may be defined as excess of the area of the building based on the image information outside the building outline based on the measurement information over a threshold. Herein, the threshold is a reference value for determining whether to proceed with the location correction procedure of the identified correction target obstacle, and may be set differently according to various embodiments.

If determining the misalignment, in step 907, the server determines a reference point of the building. Specifically, the server determines the reference point of the correction of the same building in the image information and the measurement information. In so doing, the reference point based on the image information and the reference point based on the measurement information are determined at the same relative location of the same building. Herein, the reference point is determined by considering the radio wave reception characteristics.

In operation 909, the server determines a location difference value of the same building in the image information and the measurement information. Specifically, the server determines the location difference value of the same building in the image information and the measurement information by comparing the reference points for the same building of the image information and the measurement information. In other words, the server may determine the location difference value of the same building in the image information and the measurement information by comparing the locations of the reference point of the building based on the image information and the reference point of the building based on the measurement information.

In step 911, the server determines whether the location difference value exceeds a threshold. In detail, the server determines whether the location difference value of the same building in the image information and the measurement information determined in step 809 by comparing the locations of the reference point of the building based on the image information and the reference point of the building based on the measurement information exceeds the threshold. Even if misalignment occurs between the locations of the same building in the image information and the measurement information, the location difference value of the same building in the image information and the measurement information may be smaller than the threshold according to the location of the reference point of the building. For example, if the building based on the image information has an error of rotating a particular angle based on the reference point compared to the building based on the measurement information, the location difference value determined using the reference point may be smaller than the threshold.

If the location difference value exceeds the threshold, in step 913, the server determines a relative location of the correction target obstacle based on the reference point of the correction based on the image information. Specifically, the server determines relative locations of the correction target obstacles identified in step 901 based on the reference point of the correction based on the image information determined in step 807.

In operation 915, the server corrects the location of the correction target obstacle using the location difference value. Specifically, the server corrects the location of the correction target obstacle by moving the location of the correction target obstacle by the location difference value of the same building in the image information and the measurement information.

According to various embodiments as described above, the location of the obstacle determined based on the image information may be corrected using the measurement information. In so doing, if one obstacle belongs to a plurality of buildings, the location of the obstacle may be corrected using a location difference value of the one building. However, if one obstacle affects a plurality of buildings, a plurality of location difference values may be used for the correction. At this time, the location of the obstacle varies, depending on how to apply the plurality of the location difference values. According to an embodiment, the location of the obstacle may be determined based on an average value of the plurality of the location difference values. According to another embodiment, importance of the building may be further considered. A procedure for correcting the location of the obstacle in consideration of the importance of the building is described below with reference to FIG. 10.

Figure 10:
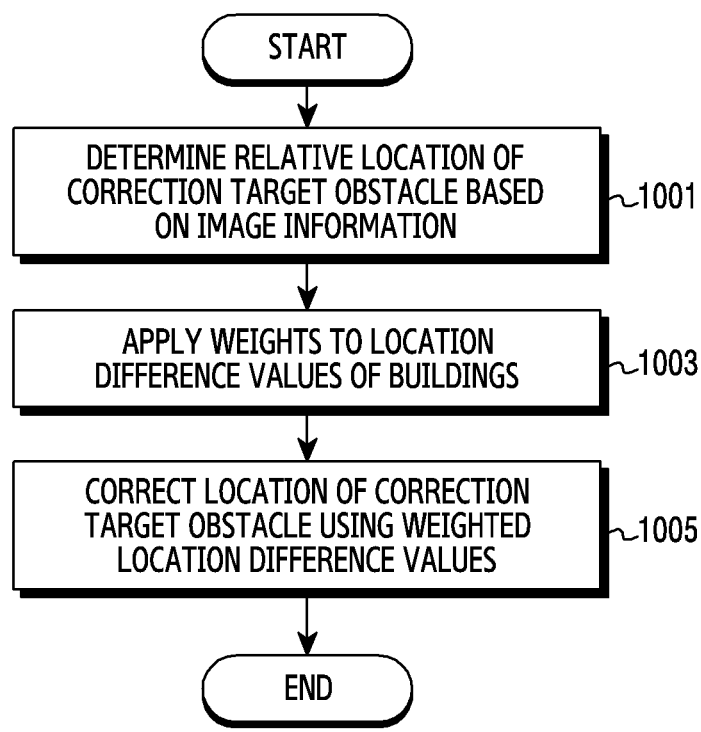
FIG. 10 illustrates a flowchart of a server for correcting a location of an obstacle by applying a weight in a wireless communication system according to various embodiments of the present disclosure.

FIG. 10 illustrates a flowchart of a server for correcting a location of an obstacle by applying a weight in a wireless communication system according to various embodiments of the present disclosure. FIG. 10 illustrates an operating method of the first server 110.

Figure 11:
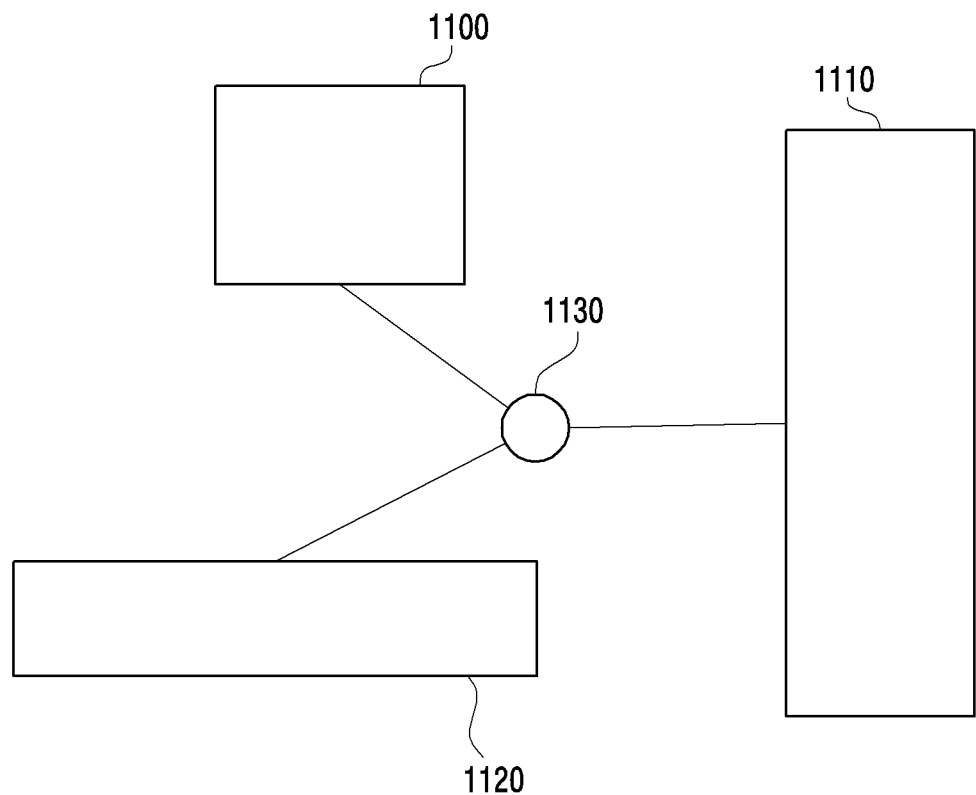
FIG. 11 illustrates an example of an obstacle adjacent to a plurality of buildings in a wireless communication system according to various embodiments of the present disclosure.

Referring to FIG. 10, in step 1001, the server determines a relative location of a correction target obstacle based on each of a plurality of buildings based on image information. In detail, the server determines the relative location of the correction target obstacle identified based on the plurality of the buildings based on the image information. For example, referring to FIG. 11, the server determines a relative location of a correction target obstacle 1130 based on reference points of buildings 1100, 1110, and 1120 based on the image information. In an embodiment, the relative location of the correction target obstacle 1130 may be relatively represented with an angle and a distance based on the reference points of the buildings 1100, 1110, and 1120 based on the image information.

In step 1003, the server applies a weight to the location difference values of the plurality of the buildings in the image information and the measurement information. Specifically, the server may determine location difference values of the plurality of the buildings in the image information and the measurement information by comparing the location of the reference point in the image information and the measurement information of each of the plurality of the buildings, and apply different weights to the location difference values. Herein, the weight for each of the plurality of buildings may be determined by considering at least one of the number of users in each building, the location of the base station, and the effect of the obstacle. In detail, the server may apply a greater weight to the location difference value of the corresponding building having the great number of the building users. In addition, the server may apply a greater weight to the location difference value of the corresponding building which closer to the base station. In addition, the server may apply a greater weight to the location difference value of the corresponding building which exerts greater effect on the radio wave reception. By applying different weights to the location difference values of the plurality of the buildings respectively, the server may vary the degree of reflecting the location difference values of the plurality of the buildings in the correction of the obstacle location using the plurality of the buildings. Thus, the server may correct the location of the correction target obstacle by considering the influence of the obstacle on the radio wave environment of each building.

In step 1005, the server corrects the location of the correction target obstacle by using location difference values of the weighted buildings respectively. For example, the server may calculate an average value of the location difference values of the weighted buildings, and correct the location of the correction target obstacle by moving the location of the correction target obstacle by the calculated average value.

Figure 12:
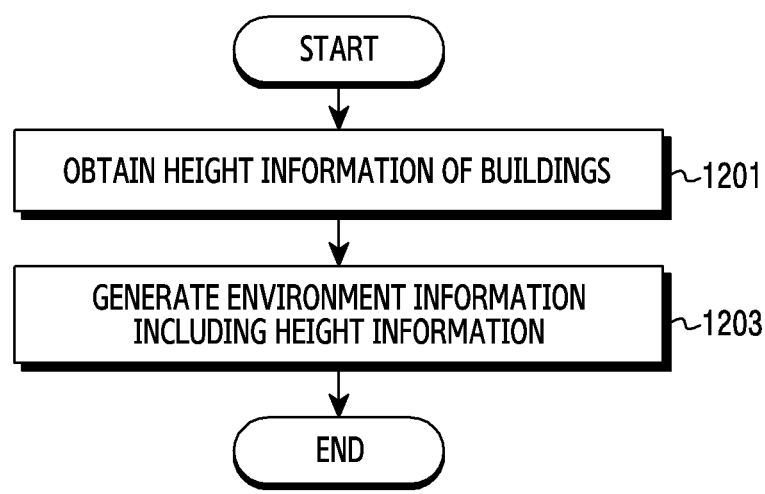
FIG. 12 illustrates a flowchart of a server for adding height information to environment information in a wireless communication system according to various embodiments of the present disclosure.

FIG. 12 illustrates a flowchart of a server for adding height information to environment information in a wireless communication system according to various embodiments of the present disclosure. FIG. 12 illustrates an operation method of the first server 110.

Figure 13:
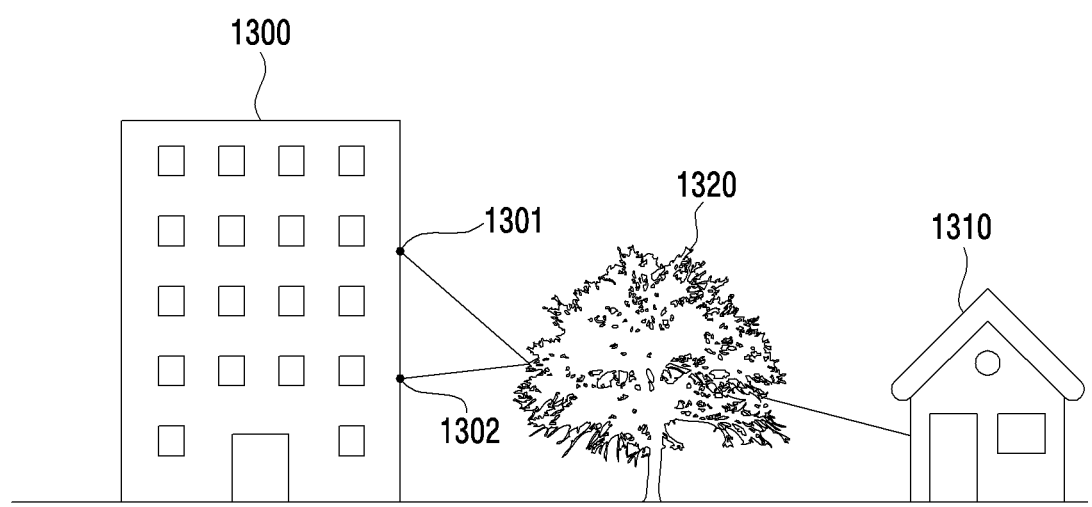
FIG. 13 illustrates an example of a distance difference from an obstacle according to a height in a wireless communication system according to various embodiments of the present disclosure.

Referring to FIG. 12, in step 1201, the server obtains height information of buildings. For example, the server may extract the height information from the measurement information. For example, referring to FIG. 13, the server may acquire height information of buildings 1300 and 1310.

In operation 1203, the server generates environment information including height values using the height information. If the height information is included in the location of the building, floors having different heights may be distinguished. Since relative locations of an obstacle (e.g., an obstacle 1320) with respect to the floors of the different heights are different, considering the height enables more accurate simulation. Thus, for the more accurate simulation, the server may generate the environment information having three-dimensional (e.g., longitude, latitude, height) location information, by adding the height information to two-dimensional (e.g., longitude and latitude) location information.

According to various embodiments as mentioned above, generating the environment information may include correcting the location of the obstacle. According to an embodiment, the environment information generated as described above may be used for a simulation for the network design. An embodiment of using the environment information for the simulation is described below with reference to FIG. 1.

Figure 14:
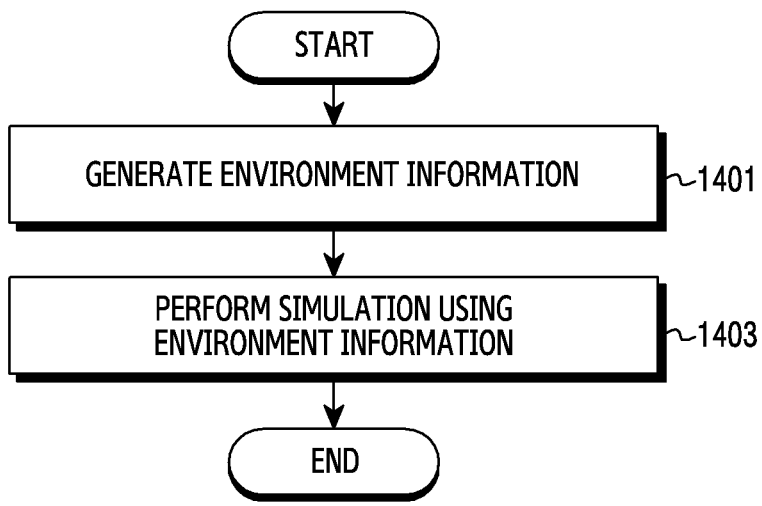
FIG. 14 illustrates a flowchart for performing a simulation using environment information in a wireless communication system according to various embodiments of the present disclosure.

FIG. 14 illustrates a flowchart for performing a simulation using environment information in a wireless communication system according to various embodiments of the present disclosure. FIG. 14 illustrates an operating method of the first server 110. However, the procedure described below may be performed by a separate server different from the first server 110.

Referring to FIG. 14, in step 1401, the server generates environment information. For example, the server may determine locations of a building and an obstacle using image information, and modify the locations of the building and the obstacle using measurement information. In detail, the server may generate the environment information according to the various embodiments stated above.

In step 1403, the server performs a simulation using the environment information. The simulation may be performed by considering various items considering direction, reflection, absorption, and transmission of the signal, as well as evaluation of path lose. For example, the server may perform the network design simulation in a radio channel between the base station and the user equipment by using arrangement information of the buildings and obstacle information such as a tree. The server may determine service availability based on at least one index related to a signal acquired by the network design simulation. For example, the server may determine the service availability, by comparing a quality value and a change rate of the signal with a threshold. Furthermore, the server may suggest a a new base station installation location based on the simulation result, or determine at least one information for improving communication quality.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

In addition, the program may be stored in an attachable storage device accessible via a communication network such as Internet, Intranet, local area network (LAN), wide LAN (WLAN), or storage area network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

Meanwhile, while the specific embodiment has been described in the explanations of the disclosure, it will be noted that various changes may be made therein without departing from the scope of the disclosure. Thus, the scope of the disclosure is not limited and defined by the described embodiment, and is defined not only the scope of the claims as below and their equivalents.

What is claimed is:

1. A method for generating environment information in a wireless communication system, the method comprising:
   determining whether a misalignment between first information of a building and second information of the building occurs based on a comparison of a threshold value with a value of at least one of:
      an area of a non-overlapping portion in a location of the building indicated by the first information and the location of the building indicated by the second information; or
      a ratio of an overlapping portion and the non-overlapping portion exceeding a respective threshold value,
   based on determining that a misalignment occurs, determining a difference value between the location of the building determined based on the first information and the location of the building determined based on the second information; correcting a location of an obstacle determined using the first information based on the difference value; and transmitting the environment information generated based on the corrected location of the obstacle, to a device which performs a simulation for network design using the environment information;
   based on determining that a misalignment does not occur, transmitting the environment information generated based on the second information, to a device which performs a simulation for network design using the environment information,
   wherein the first information is associated with an image of the building obtained based on photographing, and
   wherein the second information is associated with a measurement of the building obtained based on at least one of reflected waves of light or electromagnetic signals.

2. The method of claim 1, further comprising:
   determining the obstacle based on at least one of a distance of the obstacle from the building, or a signal path between a receiver located in the building and a base station.

3. The method of claim 1, further comprising:
   determining a difference value between a location of another building determined based on third information and the location of the another building determined based on fourth information, if the misalignment occurs,
   wherein the location of the obstacle is corrected based on the difference value of the building and the difference value of the another building,
   wherein the third information is associated with an image of the another building obtained based on photographing, and
   wherein the fourth information is associated with a measurement of the another building obtained based on at least one of reflected waves of light or electromagnetic signals.

4. The method of claim 3, wherein correcting the location of the obstacle comprises:
   applying a first weight to the location difference value of the building, and a second weight to the location difference value of the another building;
   determining an average value of the location difference values applied with the first weight and the second weight; and
   redetermining the location of the obstacle using the average value.

5. The method of claim 1, further comprising:
   extracting height information of the building from the second information; and
   including the height information in the environment information.

6. The method of claim 1, further comprising:
   performing a simulation for network design using the environment information.

7. An apparatus for generating environment information in a wireless communication system, comprising:
   a transceiver for transmitting and receiving a signal; and
   at least one processor connected with the transceiver,
   wherein the at least one processor is configured to:
      determine whether a misalignment between first information of a building and second information of the building occurs based on a comparison of a threshold value with a value of at least one of:
         an area of a non-overlapping portion in a location of the building indicated by the first information and the location of the building indicated by the second information, or a ratio of an overlapping portion and the non-overlapping portion exceeding a respective threshold value, based on determining that a misalignment occurs, determine a difference value between the location of the building determined based on the first information and the location of the building determined based on the second information, correct a location of an obstacle determined using the first information based on the difference value, and transmit the environment information generated based on the corrected location of the obstacle, to a device which performs a simulation for network design using the environment information;

based on determining that a misalignment does not occur, transmit the environment information generated based on the second information, to a device which performs a simulation for network design using the environment information, wherein the first information is associated with an image of the building obtained based on photographing, and wherein the second information is associated with a measurement of the building obtained based on at least one of reflected waves of light or electromagnetic signals.

8. The apparatus of claim 7, wherein the at least one processor is further configured to:

determine the obstacle based on at least one of a distance of the obstacle from the building, or a signal path between a receiver located in the building and a base station.

9. The apparatus of claim 7, wherein the at least one processor is further configured to:

determine a difference value between a location of another building determined based on third information and the location of the another building determined based on fourth information, if the misalignment occurs, wherein the location of the obstacle is corrected based on the difference value of the building and the difference value of the another building, wherein the third information is associated with an image of the another building obtained based on photographing, and wherein the fourth information is associated with a measurement of the another building obtained based on at least one of reflected waves of light or electromagnetic signals.

10. The apparatus of claim 7, wherein the at least one processor is further configured to:

extract height information of the building from the second information, and include the height information in the environment information.

11. The apparatus of claim 7, wherein the at least one processor is further configured to:

perform a simulation for network design using the environment information.

* * * * *